United States Patent [19]

Jones et al.

[11] Patent Number: 5,382,370
[45] Date of Patent: Jan. 17, 1995

[54] SCREENING SYSTEM

[75] Inventors: Thomas R. Jones; Reginald L. Phillips; Hugh R. Falcon-Steward, all of St. Austell, United Kingdom

[73] Assignee: ECC International Ltd., United Kingdom

[21] Appl. No.: 39,046

[22] PCT Filed: Nov. 28, 1991

[86] PCT No.: PCT/GB91/02106
§ 371 Date: Apr. 7, 1993
§ 102(e) Date: Apr. 7, 1993

[87] PCT Pub. No.: WO92/09743
PCT Pub. Date: Jun. 11, 1992

[30] Foreign Application Priority Data

Nov. 29, 1990 [GB] United Kingdom ............... 9026028

[51] Int. Cl.⁶ ............... B01D 33/06; B01D 33/56; B01D 33/82
[52] U.S. Cl. ............... 210/781; 210/797; 210/808; 210/117; 210/360.1; 210/406; 210/416.1; 209/198; 209/350; 209/502; 209/906
[58] Field of Search ............... 209/198, 199, 350, 502, 209/906; 210/117, 161, 216, 359, 360.1, 365, 398, 406, 416.1, 512.1, 781, 787, 797, 818

[56] References Cited

U.S. PATENT DOCUMENTS

| 3,547,267 | 12/1970 | Sutherland | 209/240 |
| 4,613,432 | 9/1986 | Racine et al. | 209/254 |
| 4,718,945 | 1/1988 | Schaper et al. | 210/380.1 |
| 4,936,990 | 6/1990 | Brunsell et al. | 210/380.1 |

FOREIGN PATENT DOCUMENTS

| 2018677 | 10/1971 | Germany . |
| 3138430 | 8/1982 | Germany . |
| 4451 | of 1913 | United Kingdom . |
| 1102700 | 2/1968 | United Kingdom . |
| WO90/06396 | 6/1990 | WIPO . |
| WO91/01815 | 2/1991 | WIPO . |

OTHER PUBLICATIONS

Packaging Applications of Polytetrafluoroethylene, *Packaging*, Mar. 1969, pp. 80–83.

*Primary Examiner*—Robert A. Dawson
*Assistant Examiner*—W. L. Walker
*Attorney, Agent, or Firm*—Parkhurst, Wendel & Rossi

[57] ABSTRACT

A process for continuously separating relatively coarse particles from a suspension of a mixture of particles in a liquid wherein the suspension is caused to pass through a screening medium which is rotating in its own plane so that the coarse particles are retained on the surface of the screening medium; characterized in that atmospheric pressure above the screening medium is caused to be in excess of the pressure below that medium.

31 Claims, 3 Drawing Sheets

SCREENING SYSTEM

In our PCT International Publication WO 91/01815 there is described an arrangement whereby a suspension of solid particulate material in a liquid is passed through a screen or sieve in order to separate the coarse particles from finer particles within the suspension.

It has been found, that although the screening operation according to that invention is effective, commercial requirements demand a higher throughput of the particulate material.

By experiment it has now been found that a faster screening rate can be achieved if there is provided a differential between atmospheric pressure above and below the screen. Thus, when the atmospheric pressure beneath the screen is lower than that above the screen it is found that the particles in suspension pass more rapidly through the screen.

In accordance with the invention there is provided a process for continuously separating relatively coarse particles from a suspension of a mixture of particles in a liquid wherein the suspension is caused to pass through a screening medium which is rotating in its own plane so that the coarse particles are retained on the surface of the screening medium and wherein the atmospheric pressure above the screening medium is caused to be in excess of the pressure below that medium.

A pressurized gas may be applied above the screening medium, and may be compressed air.

Alternatively a partial vacuum may be created beneath the screening medium, and this may be created within the confines of a drum located below the level of the screening medium.

When the drum is formed at its lower portion with plurality of holes for the emission of the finer particles in suspension after screening, the partial vacuum may be formed by passing air out through those holes, for example by means of a connection to a vacuum source.

The partial vacuum may be created by means of a plurality of outwardly projecting members provided on the drum adjacent the holes, whereby rotation of the drum creates a venturi effect over the outer face of the members thereby sucking out the air through the holes.

The differential [ΔP] between the pressures above and below the screening medium may be controlled to be within a pre-determined range by introducing air at atmospheric pressure into the area below the screening medium when the differential pressure [ΔP] exceeds a maximum of the pre-determined range.

The air at atmospheric pressure may be caused to enter the area below the screening medium via a valve which is automatically actuated in response to a variation in the differential pressure [ΔP] which causes ΔP to rise above the maximum of the pre-determined range.

The invention further comprises apparatus for continuously separating relatively coarse particles from a suspension of a mixture of particles in a liquid wherein the suspension is caused to pass through a screening medium which is rotating in its own plane so that the coarse particles are retained on the surface of the screening medium, and wherein the atmospheric pressure above the screening medium is caused to be in excess of the pressure below that medium.

Means may be provided to apply a pressurized gas above the screening medium and the pressurized gas may be compressed air.

Alternatively, means may be provided to cause the pressure beneath the screening medium to be diminished and so cause a partial vacuum to exist thereunder.

Preferably the partial vacuum is created within the confines of a drum located below the level of the screening medium.

The drum may be provided with side walls which are formed with a plurality of holes through which the finer particles in suspension are caused to be emitted, and where means are provided to create a partial vacuum within the confines of the drum by passing air out through those holes.

There may be provided a connection to a vacuum source in order to suck out the air from within the confines of the drum.

A plurality of outwardly projecting members may be provided on the drum adjacent the holes whereby rotation of the drum creates a venturi effect over the outer face of the members thereby sucking out the air through the holes and thus creating a partial vacuum within the confines of the drum.

The outwardly projecting members may be short tubes co-axially aligned with the holes in the drum and the outer faces of the tubes may be formed at an angle to the axis of the tubes.

Alternatively the outwardly projecting members may be vanes attached to the drum.

A means may be provided to control the differential pressure [ΔP] above and below the screening medium to within a pre-determined range.

Air at atmospheric pressure may be caused to enter the confines of the drum when the differential pressure [ΔP] exceeds the maximum of the pre-determined range.

A valve may be provided which is automatically actuated to cause air at atmospheric pressure to enter the confines of the drum when the differential pressure [ΔP] exceeds the maximum of the pre-determined range.

Preferably the valve is located within the confines of the drum.

The drum may be rotatably mounted on a hollow vertical shaft which extends into the confines of the drum and the valve may be arranged to co-operate with the upper end surface of said shaft.

A passage within the hollow vertical shaft may extend from within the confines of the drum to an area outside the confines of the drum.

An embodiment of the invention will now be described by way of example only, with reference to the accompanying drawings in which.

Figure 1:
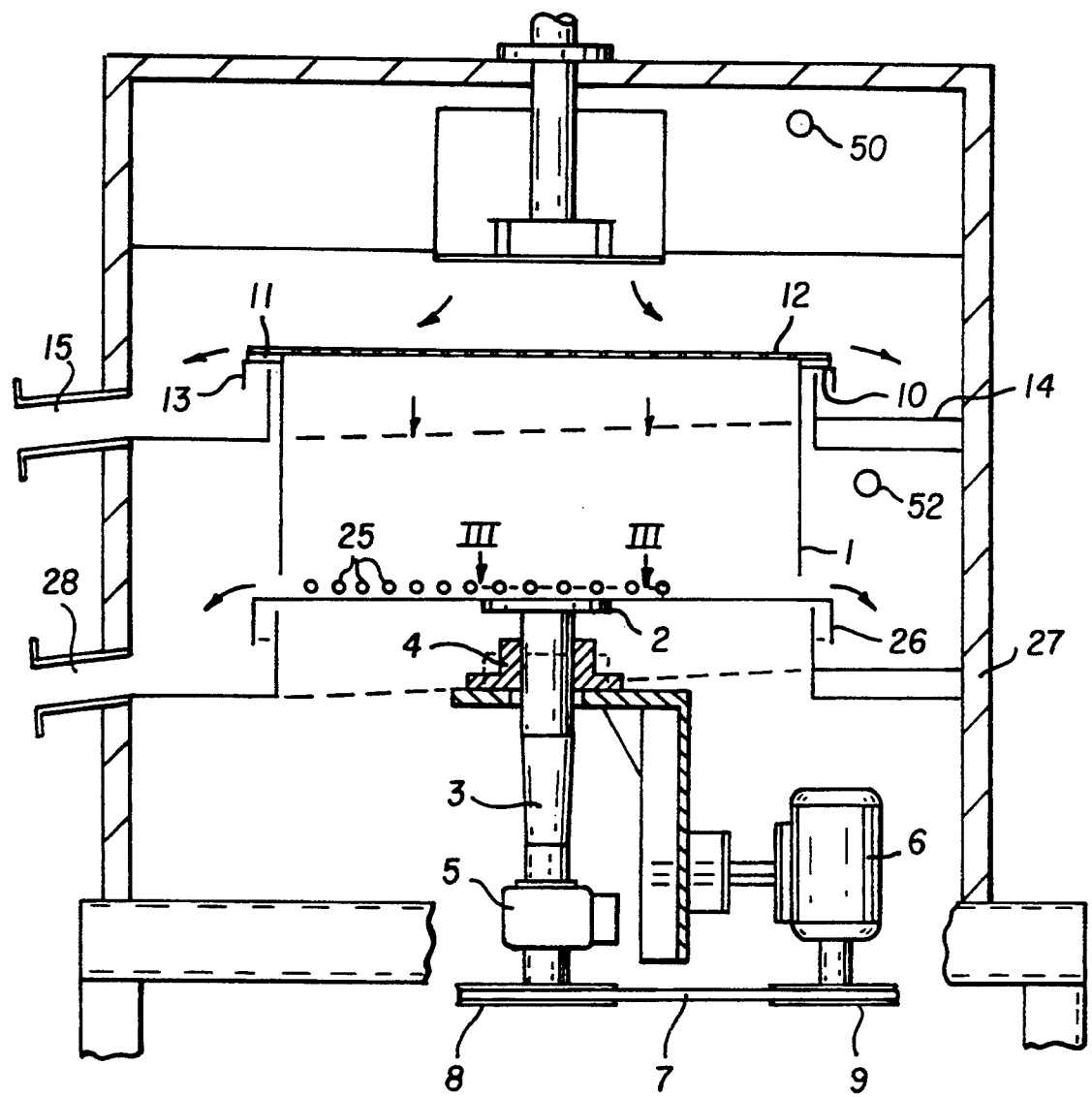
FIG. 1 is a section view of the; screening apparatus incorporating a rotating screen.

As seen in the drawings a screening apparatus, similar to that described in our PCT International Publication WO 91/01815 comprises a hollow drum 1, open at the top and mounted on a flange 2 formed on the upper end of a shaft 3 which is supported in bearings 4 and 5 and rotated by means of an electric motor 6, the drive being transmitted by a belt 7 passing over pulleys 8 and 9. A circular piece of woven wire mesh screen cloth 12 having a nominal aperture size of 0.053 mm extends across the top of the drum 1 and is removably secured thereto. The walls of the drum depend downwardly where it is closed at its lower end by a skirt member 26. The drum is provided around the lower part of its periphery with a number of holes 25.

An annular skirt member 13 is clamped to a flange 10 on the upper rim of the drum. An annular member 11 is bolted to the rim and a launder 14 encircles the drum 1 below the skirt 13.

The arrangement is such that as a mixture of particles in suspension in a liquid is deposited on the screen 12 the finer particles pass through the mesh of the screen and the larger particles which cannot pass through the mesh are centrifuged towards and over the periphery of the screen into the launder 14 from whence they are emitted via an outlet 15.

Those particles which pass through the screen with the liquid phase are emitted outwardly through the holes 25 formed in the lower portion of the walls of the drum 1 and thence via a launder 27 to an outlet 28.

In order to improve the rate of throughput of the finer particles through the mesh screen it is arranged that the atmospheric pressure above the screening medium is greater than that below the screening medium.

To that end a pipe 50, leading from a source of compressed air [not shown] is located within the area of the apparatus above the screening medium and the enhanced pressure above the screening medium is found to expedite the passage there through of the finer particles in suspension.

Alternatively, reduced air pressure from a vacuum source [not shown] is fed to a pipe 52 located as shown outwardly of the periphery of the drum 1. The reduced pressure due to the vacuum source acts through the holes 25 to the inside of the drum and creates a partial vacuum therein, thus expediting the passage of the finer particles in suspension through the mesh screen.

Figure 2:
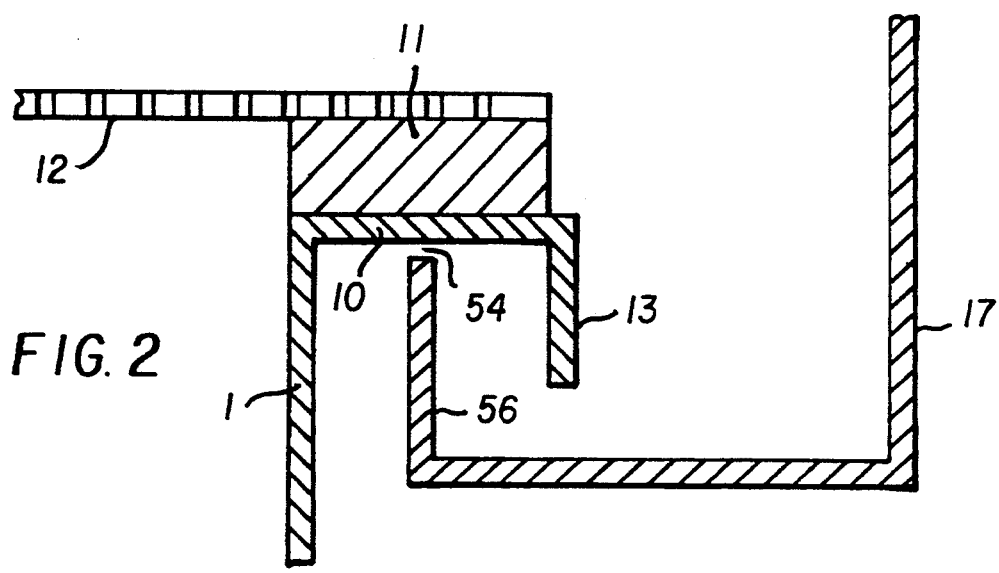
FIG. 2 is a partial section view of parts seen in FIG. 1, but to a larger scale.

To ensure that the partial vacuum within the drum 1 is maintained due to the effect of the vacuum source acting through the inlet 52, it is so arranged that the sum of the cross sectional areas of the holes 25 is greater at all times than the area of the annular gap 54 between the flange 10 and the top most portion of the upstanding annular wall 56 of the launder 14. The gap 54 [FIG. 2] would in this case be little more than a mere working clearance.

Figure 3:
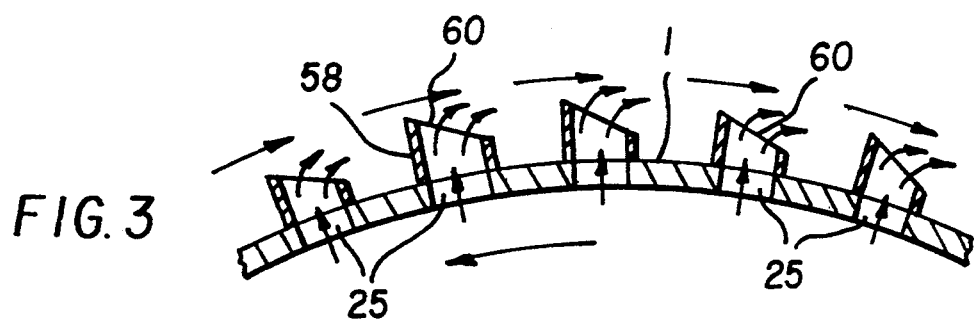
FIG. 3 is a section view on the line III—III in FIG. 1.

The holes 25 formed in the walls of the drum have the effect of causing air to be sucked out of the drum as it rotates. To enhance this effect even further the holes 25 are provided on the outside of the walls of the drum with short outwardly projecting tubular members 58. As seen in FIG. 3 the outermost ends of the members 58 are formed at an angle with respect to their axes.

As the drum 1, with its mesh screen cloth 12, is rotated in an anti-clockwise direction as seen from above, the passage of air above the angled face 60 of each of the members creates a venturi effect, sucking air out of the drum and thus causing a partial vacuum to exist therein.

Figure 4A:
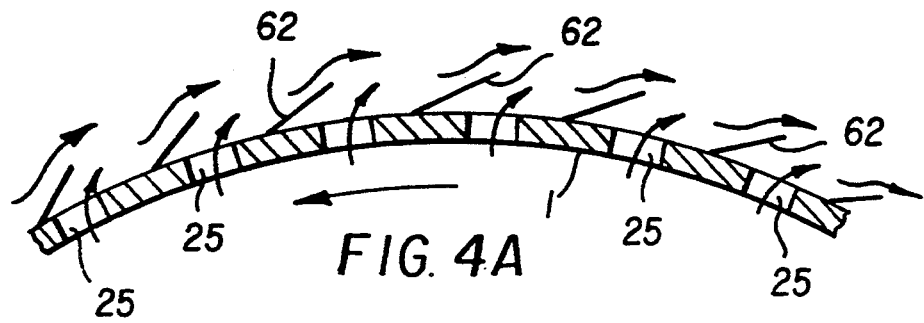
FIG. 4A is a view similar to FIG. 3 but of an alternative embodiment.
Figure 4B:
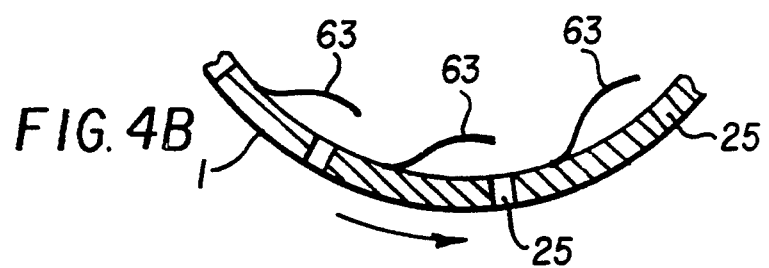
FIG. 4B is a view similar to FIG. 4A but of a further alternative embodiment.
Figure 5:
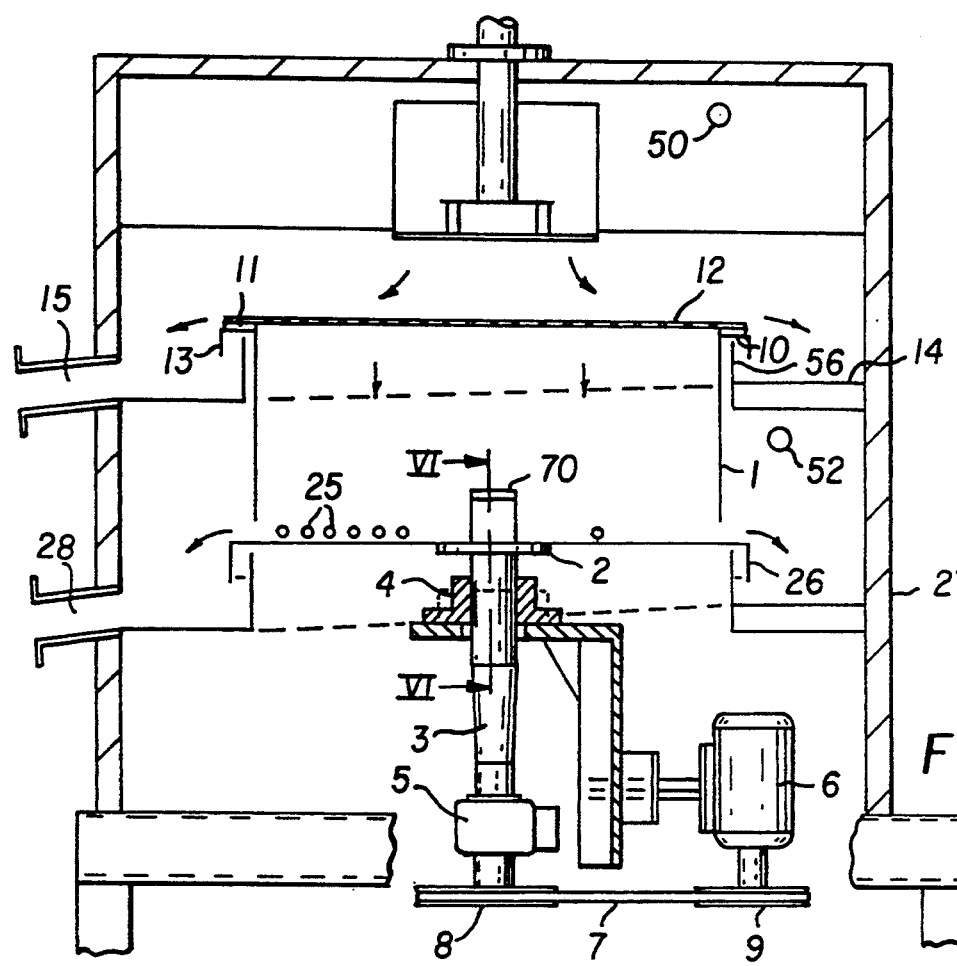
FIG. 5 is a view similar to FIG. 1 but showing an alternative embodiment of the invention.

In a simpler form, there may be provided a series of angular vanes, indicated at 62 in FIG. 4A, each vane being set between a pair of the holes 25. The passage of air over the vanes has a venturi effect over the holes and creates a partial vacuum within the drum as described earlier. Alternatively vanes 63 may be located within the drum as seen in FIG. 4B and act as scoops to assist in extracting the wetter parts of the suspension.

It was found that the provision of differential pressures above and below the screening medium causes a considerable increase in the speed of passage of the particle containing liquid phase. This is effective whether the differential pressures were caused by either increasing the pressure above the screen material or by decreasing the pressure below the screen.

For optimum operation of the screening material, the difference, $\Delta P$, between the pressure above the screen and that below the screen has a well defined optimum range, depending on the aperture size of the screening mediums.

Typical values for the pressure differential between that above the screen and that below it [$\Delta P$] are given for a range of aperture sizes in the Table 1, $\Delta P$ relating to a liquid phase consisting of essentially pure water i.e. with no dissolved surfactant, and a screen mesh made from stainless steel wire.

TABLE 1

| Meshes per Inch | Approx. Aperture Size/um | Maximum Value of $\Delta P$ | |
|---|---|---|---|
| | | p.s.i. | $kNm^{-2}$ |
| 400 | 38 | 0.8 | 5.5 |
| 350 | 45 | 0.7 | 4.8 |
| 300 | 53 | 0.64 | 4.4 |
| 200 | 75 | 0.46 | 3.2 |
| 170 | 90 | 0.4 | 2.8 |
| 150 | 104 | 0.3 | 2.1 |
| 120 | 125 | 0.26 | 1.8 |
| 100 | 150 | 0.24 | 1.66 |

The performance of the rotating screen was found to be improved when it contained a device which controlled the value of $\Delta P$ across the screening medium to a predetermined range and prevented $\Delta P$ from reaching too high a value.

Figure 6:
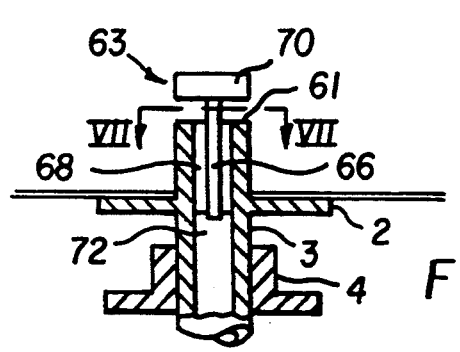
FIG. 6 is a section view on the line VI—VI of FIG. 5.
Figure 7:
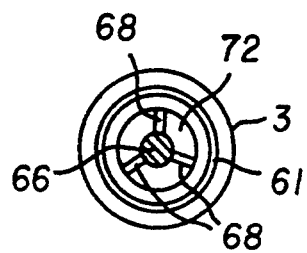
FIG. 7 is a section view of the line VII—VII of FIG. 6.

To this end, and in order to control the differential pressure as described, the topmost end of the hollow shaft 3 extends above its flange 2 into the confines of the drum 1 and the upper surface of the shaft is provided with an O-ring 61 [see FIGS. 6 and 7]. A valve 63 having a mushroom head 70 and a stem 66 is loosely guided within the interior of the hollow shaft 3 by means of vanes 68.

The weight of the valve is such that it rests with the underside of its mushroom head 70 against the O-ring 61 on top of the hollow shaft, sealing the interior of the drum from any ingress of air via the passage 72 formed in the shaft.

Figure 8:
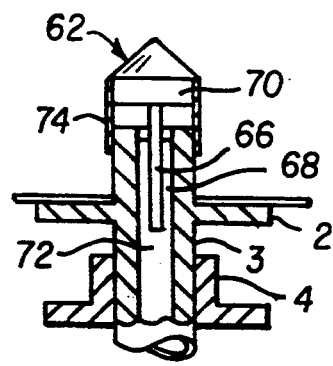
FIG. 8 is a section view showing an alternative valve member.
Figure 9:
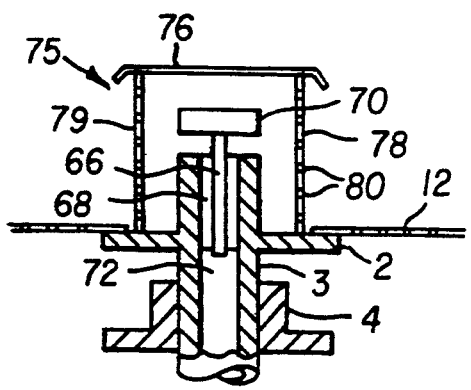
FIG. 9 is a section view showing yet another alternative arrangement of the valve member.

When the difference in pressures $\Delta P$ above and below the screen reaches a pre-determined level, the valve opens, as seen in FIGS. 6, 8 & 9, allowing air to enter the confines of the rotating drum 1 thus preventing the value of $\Delta P$ rising above the desired pre-determined level.

The valve 70 may be one of a set of interchangeable valves, each of a different weight, and each of which may be selected in accordance with the desired value of ΔP, which in turn depends on the circumstances prevailing, i.e., the size of mesh apertures, value of surface tension of the liquid phase.

Under normal circumstances the pressure above the mesh screen is atmospheric pressure and that below the screen is dependent upon the partial vacuum generated below the screen e.g. via hole 52 seen below the launder 14 in FIG. 1.

When the value of ΔP rises above the optimum range for the circumstances prevailing, i.e., when the partial vacuum within the drum exceeds the predetermined level, this causes the valve head 70 to be raised from its seating on the O-ring 61 on the top surface of the hollow shaft 3, allowing ingress of air at atmospheric pressure to enter the confines of the drum, and thus reducing the value of ΔP.

In order to prevent slurry containing particles within the suspension falling on to and resting on the top of the valve head 70, the head may be formed with an inverted conical upper surface as seen in FIG. 8, or with a domed upper surface. Any slurry which falls on to the top surface of the valve head is centrifuged therefrom.

Furthermore, a cylindrical skirt 74 may be provided to prevent any particles or particle-containing slurry from becoming entrapped between the underside of the head 70 and the upper surface of the shaft 3.

In an alternative arrangement seen in FIG. 9 the valve is enclosed within a cage structure 75 in order to prevent particles within the suspension falling on to the top of the valve head 70. An imperforate capping plate 76 is supported by the wall 78 of a cylinder 79 secured to and rotatable with the flange 2. The wall is formed with apertures 80 through which air passes to enter the interior of the drum when the valve head lifts to allow ingress of air through the bore 72 of the shaft 3. Alternatively the wall 78 may be imperforate but secured to the flange 2 by suitable brackets in order to create a gap between the bottom of the cylinder and the flange.

Although it has been said earlier that a vacuum source may be connected via hole 52 in the housing to create a reduced pressure within the drum 1, it is found that a reduced pressure may also be established within the drum as the mixture of water and small particles are ejected through the holes 25 in the lower part of the walls of the drum. When this pressure has fallen to a level such that the pressure of air in the bore 72 of the drive shaft 3 is sufficient to overcome the weight of the valve 62, the valve rises to admit air under atmospheric pressure into the rotating bowl thus reducing ΔP to within the optimum range. The valve then drops and the pressure in the rotating bowl begins to fall again.

This has the effect of modulating the pressure differential, ΔP, to keep it within the optimum range.

We claim:

1. A process for continuously separating coarse particles from a suspension containing the coarse particles, fine particles and liquid, comprising the steps of:
    passing the fine particles and the liquid of the suspension through a rotating screen such that the coarse particles do not pass therethrough;
    forming a pressure differential between a first area above said screen and a second area below said screen such that the first area is at a higher pressure than the second area; and
    maintaining the pressure differential to be within a predetermined range by flowing air into the second area when the pressure differential exceeds a maximum value.

2. The process of claim 1, wherein said first area is at atmospheric pressure by flowing a pressurized gas into said first area.

3. The process of claim 2, wherein said pressurized gas is compressed air.

4. The process of claim 1, wherein the second area is held in a state of a partial vacuum.

5. The process of claim 4, wherein said screen is disposed on a drum such that the drum rotates with said screen, and said second area consists of an inner volume of said drum.

6. The process of claim 5, wherein the drum comprises side walls and a plurality of holes extending through said side walls, the fine particles passing through said plurality of holes, and said partial vacuum being provided by air passing out of said drum through said plurality of holes.

7. The process of claim 6, wherein air is suctioned from the second area through said plurality of holes by means of a vacuum source.

8. The process of claim 6, wherein the air passing from the drum flows through the plurality of holes via a venturi effect due to rotation of the drum.

9. The process of claim 8, wherein said venturi effect is promoted by a plurality of members which outwardly project from said drum adjacent respective holes of said plurality of holes.

10. The process of claim 1, wherein the air which flows into the second area is at atmospheric pressure, and is controlled by a valve which is adapted to open in response to the pressure differential rising above the maximum value.

11. An apparatus for continuously separating coarse particles from a suspension containing the coarse particles, fine particles and liquid, comprising:
    a screen for receiving the suspension and preventing the coarse particles to pass therethrough and allowing the fine particles and the liquid to pass therethrough;
    rotating means for rotating said screen;
    pressure means for forming a pressure differential between a first area above said screen and a second area below said screen; and
    air flow means for preventing the pressure differential to exceed a maximum value by flowing air into said second area.

12. The apparatus of claim 11, wherein said pressure means comprises a pressurized gas inlet for flowing pressurized gas into said first area to maintain said first area at atmospheric pressure.

13. The apparatus of claim 12, wherein said pressurized gas is compressed air.

14. The apparatus of claim 11, wherein said pressure means comprises vacuum means for maintaining the second area in a state of partial vacuum.

15. The apparatus of claim 14, further comprising a drum on which said screen is disposed, the second area consisting of an inner volume of said drum.

16. The apparatus of claim 15, wherein said drum comprises side walls and a plurality of holes extending through said side walls through which the fine particles and liquid pass, the partial vacuum being formed by passage of air through said plurality of holes.

17. The apparatus of claim 16, wherein said vacuum means comprises a vacuum source.

18. The apparatus of claim 16, wherein said vacuum means comprises said plurality of holes, said air being forced through said holes by a venturi effect due to rotation of said drum.

19. The apparatus of claim 18, further comprising a plurality of outwardly projecting members secured to said drum adjacent respective holes of the plurality of holes, whereby rotation of the drum creates the venturi effect over the members thereby suctioning air through the plurality of holes and creating the partial vacuum within the drum.

20. The apparatus of claim 19, wherein said outwardly projecting members are comprised of short tubes co-axially aligned with respective holes of the plurality of holes in the drum.

21. The apparatus of claim 20, wherein at least one tube of the short tubes has an outer face which extends at an angle with respect to a central axis of the tube.

22. The apparatus of claim 20, wherein said outwardly projecting members comprise vanes secured to the drum.

23. The apparatus of claim 11, wherein said air flow means comprises a valve means which is automatically actuated via the pressure differential exceeding the maximum value, to cause air at atmospheric pressure to be introduced into said second area.

24. The apparatus of claim 23, further comprising a drum on which said screen is disposed, said drum receiving the fine particles and liquid passing through the screen, said valve means being located within said drum.

25. The apparatus of claim 24, further comprising a hollow shaft for rotating the drum, said hollow shaft being secured to and extending into said drum, said valve means adapted to allow flow of air through said hollow shaft and into said drum.

26. The apparatus of claim 25, further comprising a passage within said hollow shaft for passage of the air into the drum, said passage extending from an area outside the drum to the inner volume of the drum.

27. The apparatus of claim 25, wherein said valve means comprises a valve member having a head portion adapted to sealingly cooperate with an O-ring secured to an upper end surface of the hollow shaft.

28. The apparatus of claim 25, wherein said valve means comprises a valve member having a downwardly extending stem, and a plurality of valve vanes extending radially from the stem for guiding the stem loosely within the hollow shaft.

29. The apparatus of claim 25, wherein said valve means comprises a valve member having an upper surface which is conical and a skirt extending downwardly from said upper surface to surround an upper portion of the hollow shaft.

30. The apparatus of claim 25, wherein an upper portion of said hollow shaft and said valve means are located within a cage member.

31. The apparatus of claim 30, wherein said cage member comprises a perforated cylinder wall and a non-perforated cap member.

* * * * *